US010460497B1

(12) United States Patent
Steinbach et al.

(10) Patent No.: US 10,460,497 B1
(45) Date of Patent: Oct. 29, 2019

(54) GENERATING CONTENT USING A VIRTUAL ENVIRONMENT

(71) Applicant: Pixar, Emeryville, CA (US)

(72) Inventors: Stephan Steinbach, Emeryville, CA (US); Max Bickley, Emeryville, CA (US); Joshua Minor, Emeryville, CA (US); Ronnie Del Carmen, Emeryville, CA (US)

(73) Assignee: Pixar, Emeryville, CA (US)

( * ) Notice: Subject to any disclaimer, the term of this patent is extended or adjusted under 35 U.S.C. 154(b) by 70 days.

(21) Appl. No.: 15/593,068

(22) Filed: May 11, 2017

Related U.S. Application Data

(60) Provisional application No. 62/336,127, filed on May 13, 2016.

(51) Int. Cl.
*G09G 5/00* (2006.01)
*G06T 13/20* (2011.01)
*G06T 19/00* (2011.01)

(52) U.S. Cl.
CPC ............ *G06T 13/20* (2013.01); *G06T 19/003* (2013.01)

(58) Field of Classification Search
CPC .............................. G06T 13/20; G06T 19/003
USPC .................................. 345/418, 419, 632, 633
See application file for complete search history.

(56) References Cited

U.S. PATENT DOCUMENTS

| | | | |
|---|---|---|---|
| 9,396,588 B1* | 7/2016 | Li | ............................ G06F 3/011 |
| 2016/0133230 A1* | 5/2016 | Daniels | ................. G06T 19/006 345/633 |
| 2016/0191893 A1* | 6/2016 | Gewickey | ............ H04N 13/025 386/223 |
| 2017/0053445 A1* | 2/2017 | Chen | .................... H04N 13/279 |

\* cited by examiner

*Primary Examiner* — Sarah Lhymn
(74) *Attorney, Agent, or Firm* — Kilpatrick Townsend & Stockton LLP

(57) ABSTRACT

Embodiments can generate content (e.g., a feature film, virtual reality experience) in a virtual environment (e.g., a VR environment). Specifically, they allow fast prototyping and development of a virtual reality experience by allowing virtual assets to be quickly imported into a virtual environment. The virtual assets can be used to help visualize or "storyboard" an item of content during early stages of development. In doing so, the content can be rapidly iterated upon without requiring use of more substantial assets, which can be time consuming and resource intensive.

18 Claims, 10 Drawing Sheets

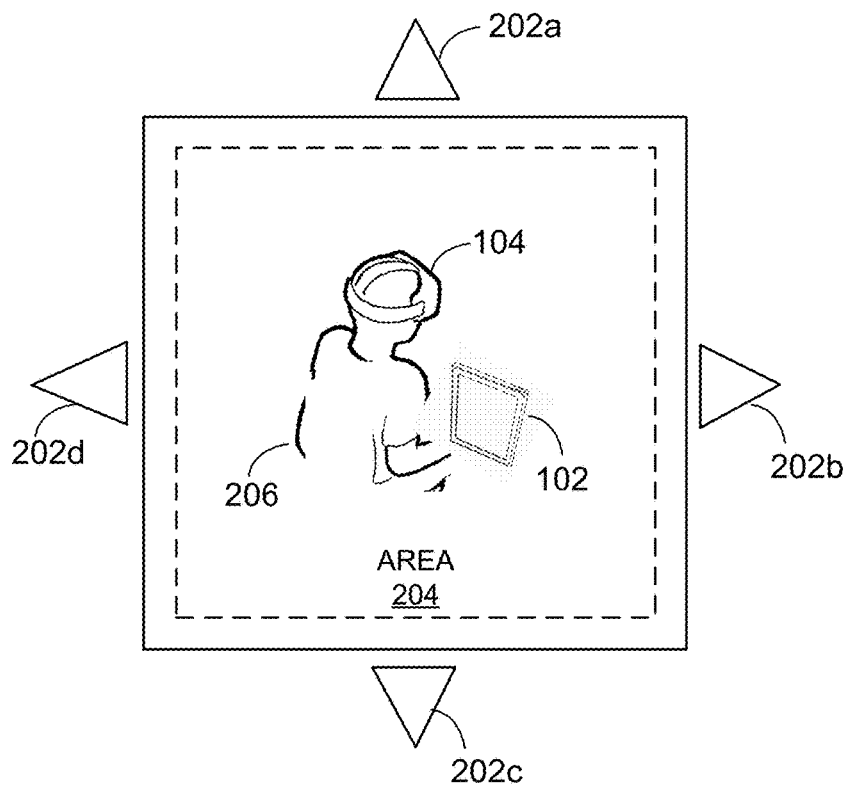
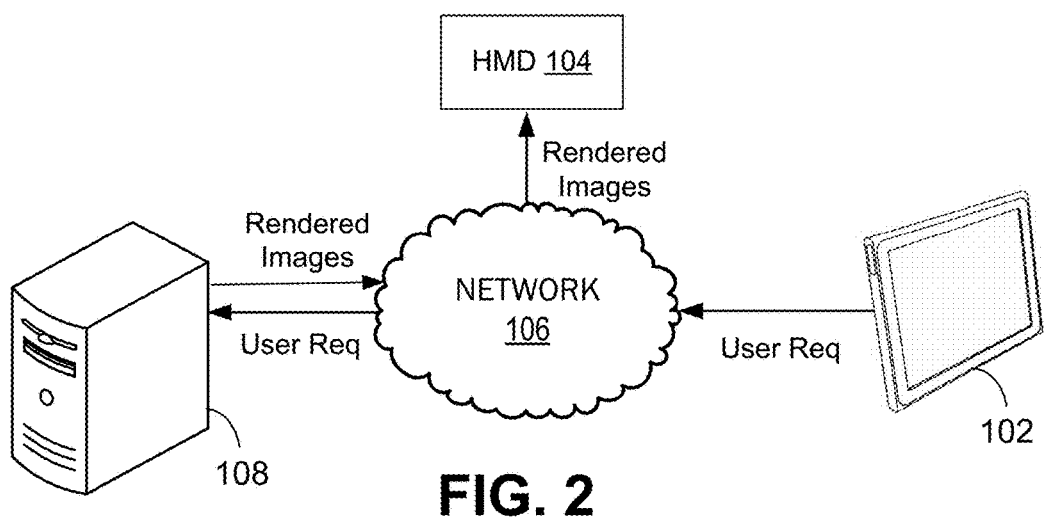
FIG. 2

GENERATING CONTENT USING A VIRTUAL ENVIRONMENT

CROSS-REFERENCES TO RELATED APPLICATIONS

This Application claims priority to U.S. Provisional Patent Application No. 62/336,127, filed May 13, 2016 and entitled "Generating Content using a Virtual Environment", the entire disclosure of which are hereby incorporated by referenced for all purposes.

BACKGROUND

Traditionally, a storyboard is conceptually drawn by storyboard artists for pre-visualizing motion picture or interactive media sequence. For example, the storyboard may represent a sequence of scenes showing concepts for an animation sequence. One problem with creation of the traditional storyboard is that it is often tedious to modify the storyboard when concepts for one or more scenes are changed.

BRIEF SUMMARY

Embodiments can generate content (e.g., a storyboard of an animated film, virtual reality experience) in a virtual environment (e.g., a VR environment). Some embodiments can allow fast prototyping and development of a virtual reality experience by allowing virtual assets to be quickly imported into a virtual environment. The virtual assets can be used to help visualize or create a "storyboard" of content during early stages of development. In doing so, the content can be rapidly iterated upon without requiring use of more substantial assets, which can be time consuming and resource intensive.

In some embodiments, set information regarding a virtual set of a three-dimensional animated scene can be received. The virtual set information can include information representing a first virtual asset placed in the virtual set. After the set information is received, view information regarding a camera view through which a first user (e.g., a director) is viewing the virtual set can be received. Based on the set information and the view information, the virtual set can be rendered and presented in the VR environment on a first display device (e.g., such as a head-mount device) to the first user.

In some embodiments, data of the rendered VR environment having the virtual set can be transmitted to a computing device (e.g., a tablet computer) associated with a second user (e.g., a technical assistant to the director). The virtual set can be presented on the second computing device and the second user may be enabled to provide an input to move the first virtual asset in the virtual set. This input can be used simulate the virtual asset movement in the VR environment. The VR environment can be re-rendered based on the simulation. The re-rendered VR environment can be presented on the first display device to the first user to show the movement of the virtual asset in the virtual set.

In some embodiments, the first user may be enabled to record the movement of the first virtual asset for playback later. In some embodiments, this recording can be used to create a digital storyboard. In some embodiments, the second user may be enabled to provide a voice input when moving the first virtual asset through the computing device associated with the second user. In those embodiments, the voice input can be used to create the storyboard. For example, the second user may provide a narrative of the scene.

Other embodiments are directed to systems and computer readable media associated with methods described herein.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

FIG. 2 illustrates an example of the system for facilitating a user to manipulate a VR environment.

DETAILED DESCRIPTION

Figure 1:
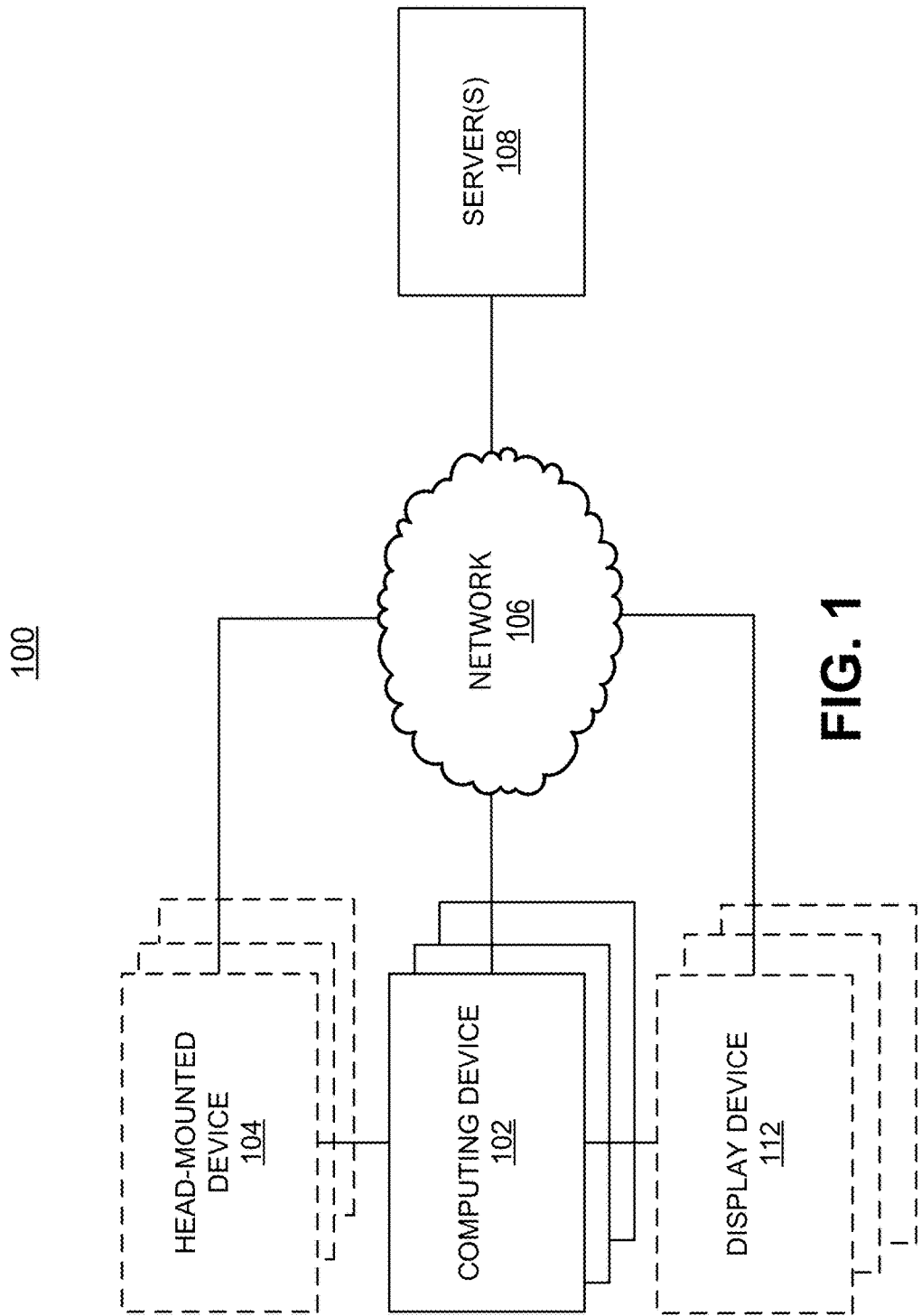
FIG. 1 illustrates an example of a system in accordance with the disclosure.

The present disclosure generally relates to generating content using a virtual environment. For example, systems and techniques may provide tools for enabling a user to quickly prototype and develop a virtual reality ("VR") experience.

I. Overview of Using VR for Storyboards

Traditionally, a storyboard is conceptually drawn by storyboard artists for pre-visualizing motion picture or interactive media sequence. For example, the storyboard may represent a sequence of scenes showing concepts for an animation sequence. One problem with creation of the traditional storyboard is that it is often tedious to modify the storyboard when concepts for one or more scenes are changed. For example, a storyboard may be first drawn by artists to show a series of initial concepts for an animation sequence. However, after reviews by different entities involved in the creation of the animation sequence, the storyboard may be required to change to reflect modified concepts for those scenes. For instance, the storyboard may include 10 drawings to represent a chase sequence in which two vehicles engage in a chase in a city block. Initially, the storyboard for this sequence may have the first vehicle crash into a store at $5^{th}$ to $7^{th}$ drawings. However, after reviewing the drawings, a director may request to remove the crash scenes from the chase sequence such that the two vehicles will pass by the store. This would require the artists to redraw not only the $5^{th}$ to $7^{th}$ drawings, but also subsequent drawings. A creator (e.g., a writer) may later add some more concepts (e.g., a person sticks out of his vehicle during the chase) to the chase sequence. This again would require redoing almost the entire drawings of the storyboard for the chase sequence.

One insight provided by the inventors is that VR may be used to create a digital storyboard. A virtual set may be first generated and presented in VR environment, and a director may immerse him/her-self in the VR environment through a headset. The virtual set may include some crude virtual assets that can be quickly imported to the VR environment to represent the virtual set. For example, the virtual set may include a meadow, a dog, and a cat such that the dog chases the cat on the meadow. Such a virtual set can be quickly generated by positioning virtual assets representing these objects in the VR environment to represent their initial positions in the virtual set.

One example contemplated is to use virtual asset cards to represent these objects in the VR environment. The virtual asset cards would include texts indicating these objects and can be quickly positioned in the virtual set. For instance, a virtual asset card with text "cat" can be created and positioned in the virtual set at its initial position in the virtual set, a virtual asset card with text "dog" can be created and positioned in the virtual set at its initial position, and a virtual asset card with text "meadow" can be created and positioned in the virtual set at its initial position. Although examples may refer to virtual asset cards, such description can equally apply to other types of virtual assets.

Such a virtual set of objects with simple shapes can be quickly created on a computing device by an artist. For example, virtual set information for implementing the virtual set described above can be generated to include virtual asset information indicating initial positions for the dog, cat and meadow. A VR environment can be implemented based on the virtual set information. The virtual assets—e.g., the dog, the cat, and the meadow can be mapped into the VR environment. In some implementations, the objects in the VR environment may have more details than the virtual assets when first created on the computing device. For example, a template dog character may be implemented in the VR environment to represent the virtual asset card "dog" in the virtual set, a template cat character may be implemented in the VR environment to represent the virtual asset card "cat" in the virtual set, and a template meadow object can be implemented in the VR environment to represent the virtual asset card "meadow" in the virtual set. However, this is not necessarily the only case. In some implementations, the virtual assets in the virtual set can be represented in the VR environment in crude forms. For example, a virtual card having a simple drawing of a dog may be used to represent the dog in the VR environment; a virtual card having a simple drawing of a cat may be used to represent the cat in the VR environment; a virtual card have a simple meadow drawing a meadow may be used to represent the meadow in the VR environment.

Such a VR environment may be presented to a first user (e.g., a director) on a head-mount device (HMD) worn by the first user. The first user may look around in the VR environment by tilting the HMD and/or walk around in an area monitored by sensors or tracking devices. The first user may be enabled to adjust the virtual set by moving the VR assets in the VR environment and thus create a new view or new views of the VR environment.

The VR environment viewed and controlled by the first user can be displayed on a computing device (e.g., a tablet device) associated with a second user (e.g., an assistant of the director). The first user may instruct the second user (e.g., verbally) to move one or more VR assets in the VR reality environment to create movements of the VR asset(s). For example, the first user may instruct the second user to drag the dog and the cat for a distance to their right on the meadow to show the dog is chasing the cat on the meadow.

Inputs for moving the virtual assets from the second user can be received and views of the VR environment can be regenerated to show the movements of the virtual assets to the first user through the HMD device. In some examples, the first user may be enabled to generate instructions to record the movements of the virtual assets when the first user is satisfied with the movements of the virtual asset cards as controlled by the second user. The recording can be stored and later retrieved to be viewed on a HMD, or a computing device as animation representing a digital storyboard.

In some implementations, more than one user may be involved in helping the first user create the digital storyboard. For example, a third user may be involved to move one or more other VR assets at the same time (or substantially at the same time) when the second user is moving the VR assets. The movement of multiple assets can partially overlap or be sequential, with no overlap. In this way, multiple VR assets (in some cases, a large number of VR assets) may be moved in the virtual set at the same time (or substantially at the same time) to create a more complicated digital storyboard. In some implementations, the second and/or the third user may be enabled to provide voice inputs when moving the virtual assets. The voice inputs can be captured and synchronized with the movements of the virtual assets in the VR environment. Such voice inputs can be used as voice over for digital storyboard. For example, the second user may be asked to read a dialogue when he/she moves a virtual asset in the virtual set representing the voice of the virtual asset.

II. System Architecture for Rendering Virtual Reality

FIG. 1 illustrates an example of a system 100 in accordance with the disclosure. System 100 can render a view of a virtual reality (VR) environment for display on an interactive device associated with a user. As shown, the system 100 may include a server 108 (e.g., one or more server computers) that is configured to provide content to, and/or control one or more interactive devices. The one or more interactive devices may include one or more computing devices 102, one or more head-mounted devices 104, one or more display devices 112, or other suitable interactive device(s), which may communicate directly with each other (e.g., using Bluetooth).

The server 108 can be configured to implement an instance of the VR environment and to determine view information defining views of the VR environment. The view information determined by the server 108 can be communicated (e.g., via streaming, via object/position data, and/or other information) from server 108 to the interactive devices for presentation to users. The view information determined and transmitted to the interactive devices can correspond to a location in the VR environment (e.g., the location from which the view is taken, the location the view depicts, and/or other locations), a zoom ratio, a dimensionality of objects, a point-of-view, and/or view parameters. One or more of the view parameters may be selectable by the user.

The instance of the VR environment can comprise a simulated space that is accessible by a user via the interactive devices, which may present the views of the VR environment to the user. For example, the views of the VR environment can be presented to the user via a display coupled to the interactive devices or may be presented to the user directly on the interactive devices. The simulated space can have a topography, express ongoing real-time interaction by one or more users, and/or include one or more objects positioned within the topography that are capable of locomotion within the topography. The topography can be a 3-dimensional topography. The topography can include dimensions of the space, and/or surface features of a surface or objects that are "native" to the space. In some instances, the topography may describe a surface (e.g., a ground surface) that runs through at least a substantial portion of the space. In some instances, the topography can describe a volume with one or more bodies positioned therein (e.g., a simulation of gravity-deprived space with one or more celestial bodies positioned therein).

The above description of the manner in which views of the VR environment are determined by the server 108 is not intended to be limiting. Server 108 can be configured to express the VR environment in a more limited, or richer, manner. For example, views determined for the VR environment may be selected from a limited set of graphics depicting an event in a given place within the VR environment. The views can include additional content (e.g., text, audio, pre-stored video content, and/or other content) that describes particulars of the current state of the place, beyond the relatively generic graphics.

The server 108 can communicate the view information with the interactive devices in a client/server architecture via a network 106 as shown. In some embodiments, the network 106 may include one or more cloud infrastructure systems that provide cloud services. A cloud infrastructure system may, for example, be operated by a service provider. In some aspects, services provided by the cloud network may include a host of services that are made available to users of the cloud infrastructure system on demand, such as remote rendering of media content. Services provided by the cloud infrastructure system can dynamically scale to meet the needs of its users. However, this is not intended to be limiting. In some examples, the network 106 may comprise a wired network, a wireless network or a combination of both.

The network 106 can comprise one or more computers, servers, and/or systems, including the server 108. In some embodiments, the computers, servers, and/or systems making up the network 106 are different from a customer's on-premises computers, servers, and/or systems. For example, the network 106 may host an application, and a user or customer may order and use the application via a communication network (e.g., network 106). In some examples, the network 106 may host a Network Address Translation (NAT) Traversal application to establish a secure connection between a service provider of the network and one or more of the interactive devices, such as the computing device 102, head-mounted device 104, or display device 112. A separate secure Transmission Control Protocol (TCP) connection may be established by each interactive device for communicating between each interactive device and the server 108 (or other server) of the cloud network. In some embodiments, each secure connection may be kept open for an indefinite period of time so that the cloud network can initiate communications with each respective interactive device at any time. Various protocols may be used to establish a secure connection between each network device and the server 108, including Session Traversal Utilities for NAT (STUN), Traversal Using Relay NAT (TURN), Interactive Connectivity Establishment (ICE), a combination thereof, or any other appropriate NAT traversal protocol.

In some cases, communications between the network 106 and interactive devices may be supported using other types of communication protocols. Such protocols may include a Hypertext Transfer Protocol (HTTP) protocol, a Hypertext Transfer Protocol Secure (HTTPS) protocol, or other suitable communication protocol. In certain embodiments, the cloud network may include a suite of applications, middleware, and database service offerings that are delivered to a customer in a self-service, subscription-based, elastically scalable, reliable, highly available, and secure manner.

The server 108 can receive a user request for displaying a view of the VR environment, from an interactive device (e.g., computing device 102, head-mounted device 104, or display device 112 shown in FIG. 1), on the interactive device from which the user request originates or on another interactive device. For example, a user input can be received from the computing device 102 for displaying a view of the VR environment on a head-mounted device 104 associated with the user. Upon receiving such a request, the server 108 can provide appropriate view information to the interactive device (or another interactive device) by rendering one or more images representing a view requested by the user and sending the rendered images to the interactive device (or another interactive device). In implementations, the server 108 can include hardware and software for a rendering algorithm to render such images. The rendering algorithm can utilize one or more scene files that contain objects in a defined language or data structure. For example, the scene file may include a description of the virtual scene that includes geometries, viewpoints, textures, lighting, and shading information of different VR environments, virtual backgrounds, and virtual objects in the scene. Any suitable rendering algorithm can be used to process the scene file to render the images of the view requested by the user. In some examples, a rendering algorithm may use one or more of rasterization techniques, ray casting techniques, ray tracing techniques, radiosity techniques, or other suitable techniques for rendering an image. In one example, the rendering algorithm used by the server 108 may include rasterization with deferred shading and dynamic global illumination. In some embodiments, the server 108 may include a graphics processing unit (GPU) in addition to a central processing unit (CPU) for rendering the images of the media content item 110.

In some examples, an interactive device can include a computing device 102. The computing device 102 can include a mobile phone, a tablet device, a laptop computer, a television or other display device, a digital video recording device, a set-top box device, or any other suitable computing device 102. The computing device 102 may be associated with a touch sensitive surface capable of sensing touches by a user. The touch sensitive surface associated with the computing device 102 can include a tactile sensor that can translate the motion and position of the user's fingers to a relative position mapped to a display of the computing device 102. Examples of the touch sensitive surface can include a touch sensitive display, a touchpad, or any other touch sensitive surface.

In some examples, an interactive device can include a head-mounted device 104. For example, the head-mounted device 104 may include a head-mounted virtual reality device, such as virtual reality goggles or glasses. In another example, the head-mounted device 104 may include three-dimensional glasses. In some examples, an interactive device may include a display device 112. For example, the display device 112 may include a television, a desktop or laptop computer, an immersion system or cave, or other suitable display device.

In some examples, an interactive device may include a display device 112. For example, the display device 112 may include a television, a projection screen, a LCD/OLED wall, or any other display device. The display device 112 may be used to present one or more views displayed on the HMDs 104 and/or computing devices 102.

In some implementations, the HMD 104, the computing device 102, and the display device 112 may be connected to each other. For example, the HMD 104 may be connected to computing device 102 such that the HMD 104 may receive inputs from computing device 102. In one instance, both the HMD 104 and the computing device 102 may be used by the same user, for example a director. In that instance, the director may wear the HMD 104 and hold the computing device 102. The director may provide an input to the HMD 104 through the computing device—e.g., call up a menu of an action items in the VR environment and select a menu item. As another example, the computing device 102 may be connected to the display device 112. For instance, a technical assistant to the director may hold the computing device 102 to provide inputs that can control or adjust one or more aspects of the display device such as brightness, contrast, zoom ration, and/or any other aspects.

With the general architecture of the system 100 for facilitating a user to manipulate a VR environment having been described, attention is now directed to embodiments of the system 100 with an emphasis on receiving user inputs for such manipulation.

FIG. 2 illustrates an example of the system 100 for facilitating a user to manipulate a VR environment. As shown in FIG. 2, the system 100 may include one or more sensors 202, such as sensors 202-*b* shown, located in the area 204. The sensors 202 may include, for example, cameras, depth sensors, infra-red sensors, light sensors, or other suitable sensors. The sensors 202 may be used to track the movement and positioning of a user 206 within the area 204. As shown, the user 206 may wear a HMD 104 and control the computing device 102 at the same time. However, this is not intended to be limiting. It should be understood the user 206 is not required to wear HMD 104 to manipulate a view of the VR environment for display via the computing device 102. In some other examples, the user 206 may use the computing device 102 to manipulate a view of the VR environment displayed on another user's HMD 104.

The sensors 202 can track the movement and orientation of the computing device 102 with in the area 204. For example, the computing device 102 can be equipped with a signal (e.g., radio) transceiver configured to communicate with sensors. The signals transmitted by the transceiver can be used to indicate position information indicating a position of the computing device 102 within the area 204. The signals can be used to indicate orientation information indicating an orientation of the computing device 102 with respect to one or more reference points. The position information can be transmitted by the sensors 202 to the server 108 for processing such that the movement of computing device 102 within the area 204 can be determined by server 108. The orientation information can be transmitted by the sensors 202 to the server 108 for processing such that a orientation change of the computing device 102 (e.g., rotating about an axis) can be determined by the server 108.

In some implementations, the computing device 102 can be configured to communicate its position information and/or orientation information to the server 108, with or without the aid of the sensors 206. For example, orientation information acquired by a gyroscope of the computing device 102 can be transmitted to the server 108 for the processing, position (and/or speed information) acquired by an accelerometer of the computing device 102 can be transmitted to server 108, and/or any other position or orientation related information can be acquired by any other components of the computing device 102 and can be transmitted to the server 108. In some examples, the communication of such information from the computing device 102 to the server 108 can be achieved via a wireless, a wired network or a combination thereof.

In some examples, the system 100 may establish a communication link with one or more interactive devices, such as the computing device 102 shown, in proximity to the system 100. For example, the system 100 may establish a Bluetooth™ link, a Zigbee™ link, or other communication link with the computing device 102 located within the area 204. Following establishment of the communication link, the system 100 may receive a request from the user 206. The user request may include a request to manipulate one or more virtual objects and/or virtual characters within the VR environment, a request for displaying a view of the VR environment, a request to augment a current view of the VR environment being displayed on a HMD 104 associated with the user, and/or any other user requests.

Upon receiving the user request from the computing device 102, the server 108 may render one or more images representing a view of the VR. In the examples where the received user request involves manipulation of one or more virtual objects and/or virtual characters within the view, the rendered images can reflect a result or results of the manipulation in the view. The server 108 can then send the rendered images to the interactive devices for presentation. In some embodiments, the computing device 102 can provide height information for the user 206. Using the height information, the server 108 can adjust the height of assets or objects rendered for in the particular view. For example, if a particular user were 6'5, the server 108 can adjust a particular character in the particular view to also be 6'5. In one aspect, assets may be downloaded from the interactive device, from local storage of the system, or from a repository available over the Internet.

In some implementations, the computing device 102 may include a tablet device. The tablet device in those implementations may serve as an input device to provide various types of inputs to the server 108. For example, the computing device 102 may enable the user 206 to select a view of the virtual reality environment for display on the HMD 104 worn by the user 206. As another example, the computing device 102 may enable the user provide a zoom ration at which the VR environment may be displayed on the HMD 104. Other examples of control that can be enabled by the computing device 102 are contemplated.

In some implementations, the HMD 104 can serve as an input device that can provide camera view information to the server 108. For example, as the user 206 walks around in the area 204, he/she may tilt his/her neck to look around. As the user 206 looks around, the HMD 104 may provide neck movement and/or head orientation information regarding the user 206 to the server 108. Such information may be used by server 108 to determine a view of the VR environment for display on the HMD 104. For example, as the user 206 looks up, the view of the VR environment can accordingly be determined by server 108 such that the view tilts up to reflect that the user 206 is looking up.

The system 100 may be used in several different applications. For example, without limitation, a director may experience immersive experience provided by the system 100 to prepare for an animation feature. For example, the director may use a computing device 102 associated with the director to provide inputs to creating digital storyboard for certain scenes, set dress one or more scenes to be used in the animation feature, to set placement of one or more virtual cameras for the animation features, to make notes about certain objects, characters, locations, or any other aspects about the VR environment, or for any other purpose. As another example, an actor may use the immersive experience provided by the system 100 to aid in his or her acting performance (e.g., maintain eye level with a digital character). As yet another example, a video game user may control a 3D holographic character within an immersive environment and interact with other assets in the immersive environment.

III. Virtual Set Generation

In some embodiments, as mentioned above, a virtual set can be presented in VR environment to a user, for example a director, through an HMD 104 worn by the user. The virtual set may be generated by an artist through an input device 102 associated with the artist. For example, the virtual set may be generated by the artist through a content input system. The content input system may include one or more computers capable of receiving input from the input device and generating a virtual asset. The input device 102 may be a device for inputting drawings to the content input system in order to generate a virtual asset. The input device may include, for example, a mouse, keyboard, drawing tablet (e.g., wacom tablet), a general tablet computer, a laptop, a desktop, and/or the like. The virtual set may include one or more virtual asset cards that can be mapped to corresponding virtual reality assets in the VR environment. An interface may be provided on the computing device associated with the artist to enable the artist to create the virtual asset cards. The virtual asset cards can be positioned in the virtual set to represent the positions of corresponding objects in the set at a given point of time.

A. Virtual Asset Generation

Figure 3:
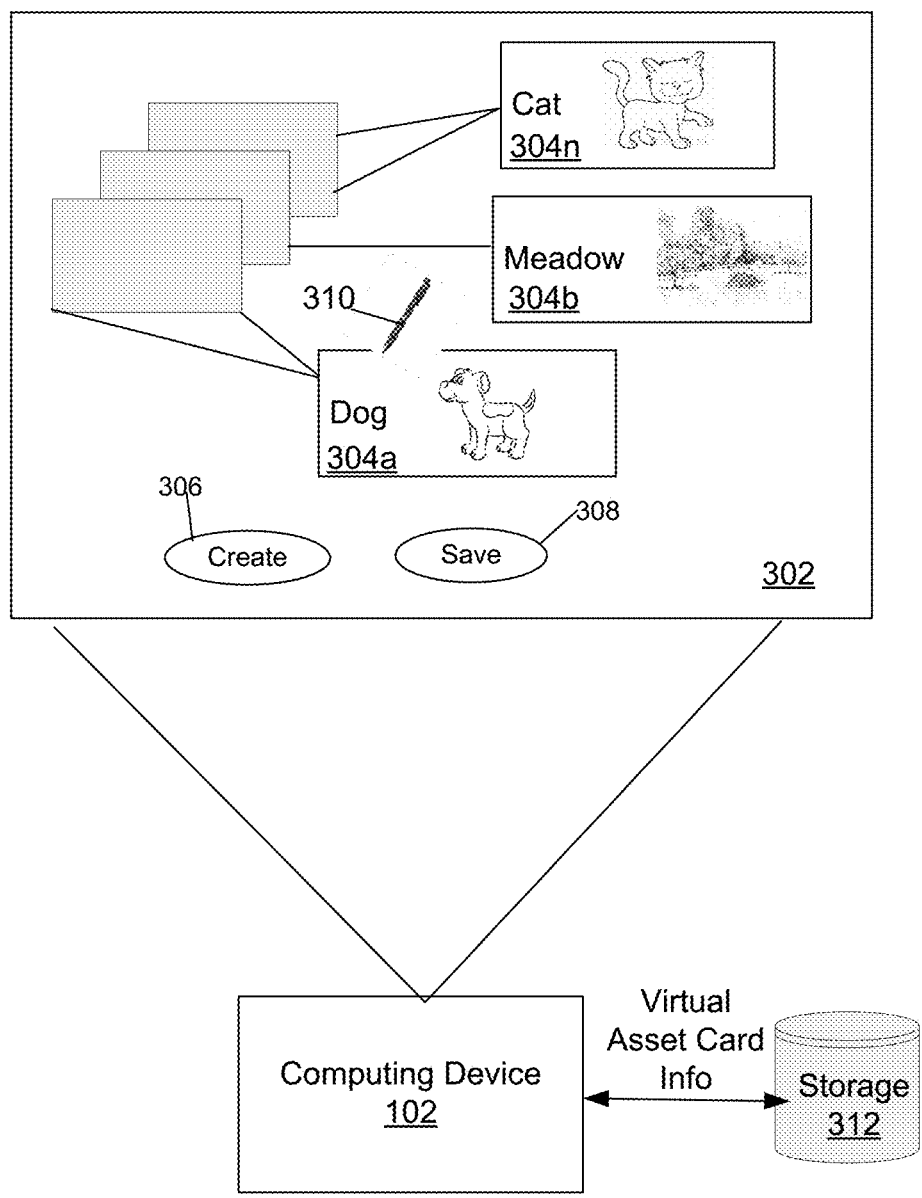
FIG. 3 illustrates one example of an interface that can be provided on a computing device associated with an artist to enable the artist to create virtual asset cards that can be placed in a virtual set in accordance with the disclosure.

FIG. 3 illustrates one example of an interface 302 that can be provided on an input device 102 associated with an artist to enable the artist to create virtual asset cards that can be placed in a virtual set in accordance with the disclosure. In some embodiments, the virtual asset cards generated based on the artist drawing may not have a depth or may have a minimal depth—i.e., 2D virtual asset cards. That is, the virtual asset cards may be flat or substantially flat (i.e., having a depth under a certain predefined amount) virtual representations of images input via the input device. For example, a user may input a drawing of a dog using the input device. The drawing may be done in color or in grayscale. For example, the user may be enabled to provide a drawing of the dog through a drawing tablet, and the content input system can obtain the drawing from the drawing tablet and generate a flat or substantially flat card that can then be added to a 3D virtual environment. In one embodiment, the content input system may automatically add color to a card based on a drawing provided in grayscale using a previous card, 3D virtual assets to which the card will be mapped, color mapping criteria, etc.

In one embodiment, each side of the virtual asset card may have images. For example, an artist may input an image of the left side of the dog. The content input system may generate a virtual asset card where the right side of the virtual asset card is a mirror image of the left side of the virtual asset card. In this way, a virtual asset card can be rapidly generated.

In some embodiments, a virtual asset card may be mapped to a relatively more complex geometric asset and/or different positions or deformations of the relatively more complex geometric asset. For example, a three dimensional geometric asset of a dog may be generated. The three dimensional geometric asset may include and/or be associated with a plurality of animation controls and variables, textures, and rig data describing how the geometric asset can move/be animated. The geometric asset may additionally be greater than a threshold depth such that it does not appear flat or substantially flat. In one embodiment, one or more virtual asset cards representing the dog may be mapped to or otherwise associated with the three dimensional geometric asset. In one aspect, a different virtual asset card may be associated with a different deformation, position, orientation, or configuration of the geometric asset. For example, a first card may include an image of the dog's mouth open. The first card may be mapped to a positioning of the geometric asset where the mouth of the geometric asset is open. Likewise, a second card may include an image of the dog's mouth closed. The second card may be mapped to a positioning of the geometric asset where the mouth of the geometric asset is closed.

As shown, the interface 302 can include a paint tool such as pen 310 for creating a given virtual asset card 304, such as the virtual asset card 304a. The given virtual asset card 304 may include description indicate a virtual asset that can be placed in the virtual set. For example, as shown, the given virtual asset card can include text and as well as art to represent the virtual asset. Multiple virtual asset cards 304 can be created and saved through interface 302.

Field controls such as button 306 and 308 can be provided in interface 302 to enable the user to create the virtual asset cards 304 and save them to storage accessible to server 108—such as the storage 312 shown in this example. It should be understood the virtual asset cards 304a-n illustrated in FIG. 3 are merely examples. Virtual asset cards in accordance with the disclosure may be represented in other forms. For example, it is contemplated that the virtual asset cards may include animation sequences of corresponding virtual assets. For instance, the virtual asset card 304a may include an animation sequence of a dog opening and closing its mouth.

In some embodiments, a second interface can also be provided on the computing device 102 associated with the artist to enable the artist to create the virtual set by placing the virtual asset cards 304 onto that interface.

Figure 4:
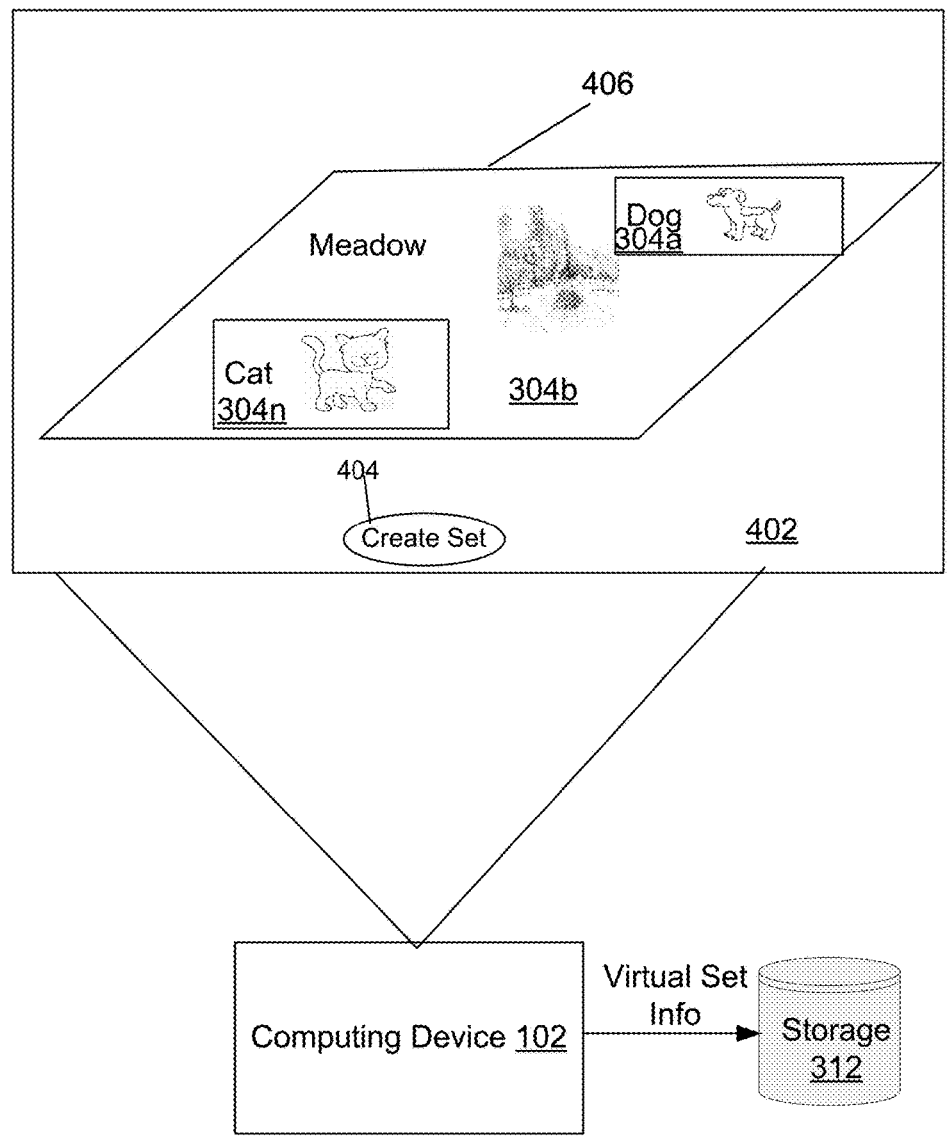
FIG. 4 illustrates on example of an interface that can be provided on the computing device associated with the artist to enable the artist to create the virtual set.

FIG. 4 illustrates on example of an interface 402 that can be provided on the computing device 102 associated with the artist to enable the artist to create the virtual set. As shown in this example, the virtual set 406 is created by an artist by retrieving virtual asset cards 304a, 304b, and 304n, and placing them onto interface 402. A field control such as button 404 can be provided in the interface 402. After the artist presses the button 404, virtual set information regarding the virtual set 406 can be generated and saved in the storage 312. For example, after the artist presses the button 404, information such as the identities of the virtual assets placed in the virtual set, the positions of those virtual assets, the dimension of the virtual set, and/or any other information related to the virtual set can be generated and saved.

In some examples, the virtual set information may include information regarding a three-dimensional animated scene. In this example, the virtual set information can include information regarding the virtual asset cards and their positions in the virtual set 406. Such virtual set information can be stored in the storage 312. The server 108 can retrieve the virtual set information from the storage 312 when rendering the virtual set 406 in the VR environment and can present the rendered VR environment to a director through an HMD 104 associated with the director.

B. VR Environment Showing the Virtual Set

Figure 5:
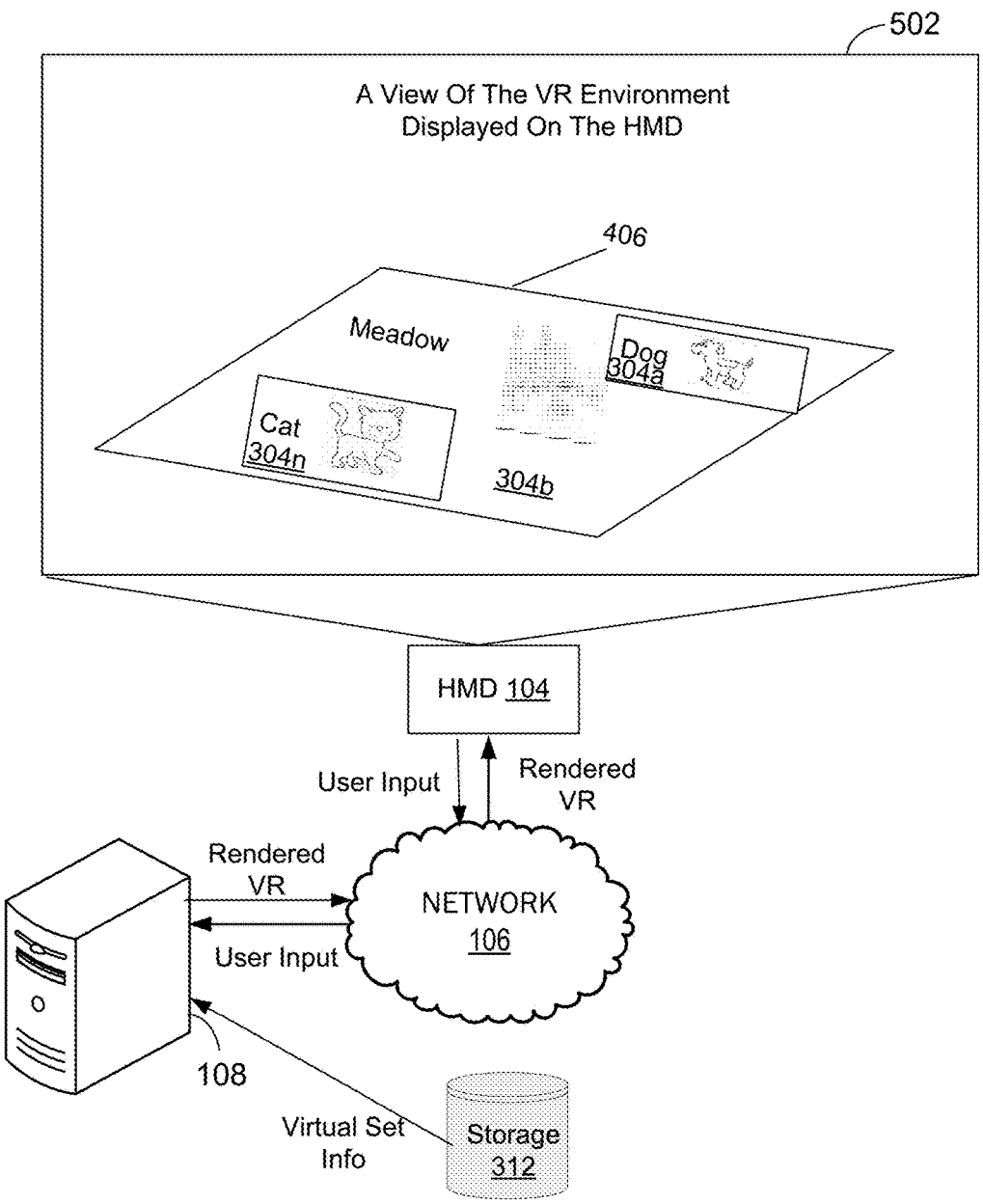
FIG. 5 illustrates one example of generating a view of a VR environment showing a virtual set in accordance with the disclosure.

As mentioned above, VR environment can be generated based on the virtual set information. FIG. 5 illustrates one example of generating a view of a VR environment showing a virtual set in accordance with the disclosure. For achieving this, the server 108 may be configured to retrieve virtual set information from storage 312. The retrieved virtual set information may be related to a particular virtual set such as the virtual set 406 shown in FIG. 4. After the virtual set information is retrieved from the storage 312, the server 108 can be configured to render a view 502 of the virtual environment. The rendering of the view of the virtual environment may be based on a user input. The user input may represent a view perspective from which the first user is looking into the virtual environment.

For example, the first user may be looking up with the HMD 104 and the orientation of the HMD and/or the position of the user can be used as user input indicating a view perspective of the VR environment the first user is looking into. When rendering, the server 108 may take a view camera view based on such user input(s). As described, in some embodiments, the virtual camera view may be controlled by physically walking around in the area 204 and/or tilting the HMD 104. For example, the first user may move forward 2 feet from his or her current location while holding the HMD 104. The server 108 may detect such movement through one or more sensors of the HMD 104 (e.g., an accelerometer, gyroscope, GPS, depth sensor, camera, wireless radio, etc.). Alternatively, a motion capture system may be used to detect movement of the HMD 104 based on markers or some other mechanism associated with the first mobile device.

As shown, the VR rendered by the server 108 can be sent to the HMD 104. For example, frames of the view of the VR environment as rendered by the server 108 can be continuously transmitted to the HMD 104 for presentation to the first user. The HMD 104 may, in turn, present the image frames generated. The image frames may be presented to the first user (e.g., the director) at or above a particular frame rate (e.g., 15 frames per second, 30 frames per second, 60 frames per second, 120 frames per second, etc.). The information regarding the detected movement of the user may be transmitted to the server 108 which may in response shift the virtual camera and transmit image frames to the HMD 104 with the virtual camera having moved forward in the virtual environment.

IV. Virtual Set Manipulation

In some embodiments, one or more virtual asset cards in the virtual environment may be presented on a computing device (e.g., a tablet) associated with a second user. It should be understood the presentation of the VR environment on the computing device associated with second user does not necessarily need to be immersive. For instance, the VR environment may be presented on a tablet device associated with the second user. In those embodiments, the virtual asset cards can be manipulated by the second user through the computing device associated with the second user. For example, the second user can be enabled to move and/or re-orient the one or more virtual asset cards in the virtual set. Based on the manipulation of the virtual asset cards provided by the second user, the one or more virtual asset cards may be moved, orientated, or changed within the VR environment.

Figure 6:
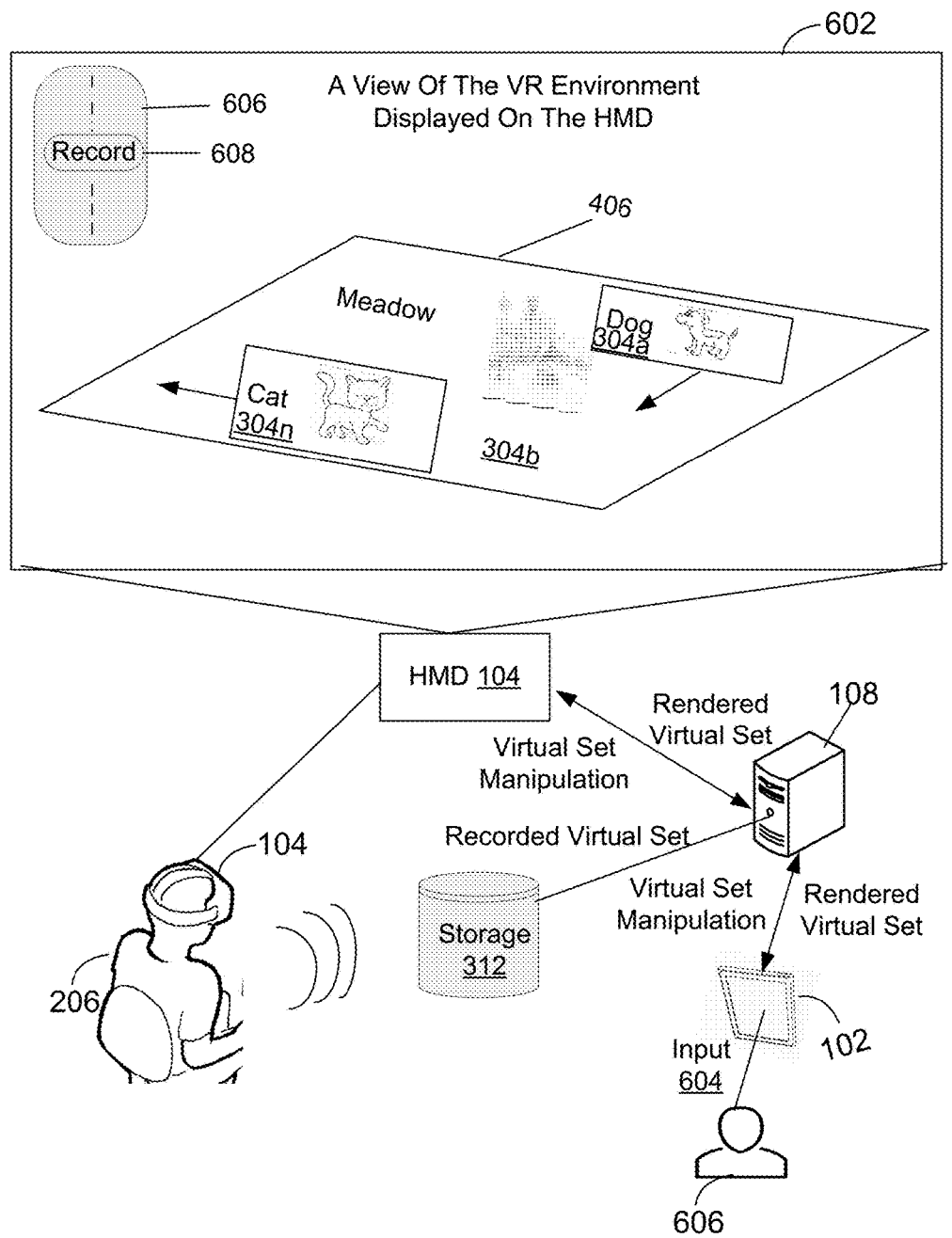
FIG. 6 illustrates an example of controlling a virtual asset in the virtual set in accordance with the disclosure.

FIG. 6 illustrates one example of manipulating virtual asset cards in accordance with the disclosure. As shown, as a first user 206, e.g., a director, looks around in the VR environment, he/she may give verbal instructions to a second user 606 to move a virtual asset card in the virtual set 406—e.g., the virtual asset card 304n in this example. As the first user 206 looks around in the VR environment—e.g., through tilting the HMD 104 and/or walking around in the physical world, different views of the VR environment may be taken and rendered by server 108. These views may be presented on the computing device 102 (e.g., a tablet) at the same time or substantially at the same time when the first user 206 changes his/her vantage point in the VR environment. As the second user 606 receives the verbal instructions from the first user 206, for example "move the cat to its left about 20 feet", the second user 606 may provide an input 604 to the computing device 102. For instance, the second user 606 may be enabled to drag the cat to its left in the virtual set 406 presented on the computing device 102. It should be understood although the instructions given by the first user to the second user is illustrated as verbal (i.e., the first user and second user are in proximity to each other and the first user verbally instructs the second user to move the virtual assets in the virtual set), this is not necessarily the only case. It is contemplated the first user may send such instructions (audible, textual, and/or graphical) to the second user through the computing device associated with the second user. For example, the first user may send the instruction to the server 108 first, which may then transmit the instruction to the computing device associated with the second user such that the verbal instruction can be played on the second computing device associated with the second user.

In some embodiments, the second user 606 may be enabled to manipulate one or more aspects of the virtual asset card based on one or more inputs provided by the second user 606. For example, the second user 606 may be enabled to manipulate the virtual asset cards displayed at a given time through a first input, a second input and/or a series of inputs. For example, the second user 606 may be enabled to provide the first input through the computing device (e.g., tapping a right button of the computing device) to display a virtual asset card 304a-1 having an image of the dog's mouth open. As described above, in some embodiments, more than one virtual asset card may be mapped to a geometric asset placed in the VR environment. In this example, a virtual asset card showing the mouth of the dog closed may also be mapped to the virtual dog in the VR environment. The second user 606 can be enabled to provide a second user input, e.g., tapping the left button of the computing device may display a virtual asset card 304a-2 having an image of the mouth of the dog closed. The virtual asset card 304a-2 may replace the virtual asset card 304a-1 in the VR environment. As another example, the second user 606 may be enabled to provide a series of inputs to display different virtual asset cards at a given moment in time. For instance, tapping the right button of the computing device by the second user 606 in a first instance may cause the virtual asset card 304a-1 to be displayed, where the card includes an image of the mouth of the dog open. Tapping the right button by the second user 606 again may cause the virtual asset card 304a-2 to be displayed, where the virtual asset card 304a-2 includes an image of the mouth of the dog closed. The virtual asset card 304a-2 may replace the virtual asset card 304a-1 in the VR environment. Tapping the right button by the second user 606 a third time may start the sequence over again (i.e., the virtual asset card with the dog mouth open is displayed again). By allowing different virtual asset cards to be shown based on user input, a user can quickly simulate animation of an asset. In some embodiments, the particular display of a virtual asset card at a given time may support animation by indicating the manner in which a corresponding complex asset (e.g., geometric asset) is to be deformed or modified. For instance, at a time t1, the virtual asset card 304a-1 may be displayed based on a user input. As such, during an animation process, a corresponding complex asset of a dog may be deformed to have an open mouth. At a time t2, the virtual asset card 304a-2 may be displayed based on another user input. As such, during the animation process, the corresponding complex asset of the dog may be deformed to have a closed mouth.

In some embodiments, the computing device 102 of the second user 606 may be mapped to a specific virtual asset card or a group virtual asset cards. User inputs provided by the second user through the computing device 102 and/or the movement of the computing device 102 may be used to manipulate the specific virtual asset card(s) mapped to the computing device 102. For example, the computing device 102 of the second user 606 may be mapped to virtual asset card 304a and the movement of the computing device 102 (e.g., a tablet) may cause the virtual asset card 304a to move accordingly in the VR environment. For instance, the second user 606 may carry the computing device 102 to his right for 5 feet to cause the virtual asset card 304a to move accordingly (e.g., to the right for about 15 feet in the VR environment). As mentioned above, the computing device 102 may be mapped to a group of virtual asset cards 304, for example a group of virtual dogs in the VR environment. In that example, the movement of the computing device 102 in the real-world by the second user will cause the group of virtual dogs to move accordingly in the VR environment.

As shown, after the user provides the input 604 through the computing device 102, information regarding manipulation of the virtual asset cards 304 based on the user input (e.g., moving the cat to its left) can be generated and transmitted to the server 108. The server 108 can then regenerate the virtual set information by simulating the manipulation of the virtual asset card as controlled by the second user 606. The regenerated set information can then be rendered by the server 108 and presented on HMD 104. In this way, the movement of the virtual asset cards can be simulated in the VR environment and presented to the first user on the HMD 104 as the second user is manipulating the virtual asset card.

In some implementations, the second user 606 may be enabled to manipulate more than one virtual asset card in the VR environment. For example, the first user may give the second user to move the cat and the dog. In those implementations, the second user may drag the virtual asset card 304n and virtual asset card 304a at the same time or substantially the same time. This can then cause the server 108 to regenerate the virtual set information and re-render the VR environment such that the movements of the virtual asset cards 304a and 304n can be simulated in the VR environment presented to the first user.

In some implementations, more than one user may be enabled to manipulate the virtual asset cards. For example, the VR set 406 may be presented on a computing device 102 (e.g., a laptop) associated with a third user. The first user 206 may give an instruction to the second user 606 to move a first set of one or more virtual asset card at a first time instance and an instruction to the third user to move a second set of one or more virtual asset card at a second time instance. For example, as illustration, the first user 206 may give an instruction to the second user 606 to move the virtual asset card 304n to its left. Two to three seconds later, the first user 206 may give an instruction to the third user to move the virtual asset card 304a forward as the second user is dragging the virtual asset card 304n as instructed. In this way, the virtual asset cards 304n and 304a may be moved one after another and in the state of motion in an overlapping period. In some implementations, the computing device 102 of the second user 606 may be mapped to a different virtual asset card or virtual asset cards than the third user's computing device 102. For example, the computing device 102 of the second user 606 may be mapped to virtual asset card 304a and the computing device 102 of the third user may be mapped to virtual asset card 304n. In that example, movements of the computing devices 102 of the second and third users can cause the corresponding virtual asset cards 304 to move in the VR environment accordingly.

In some implementations, a virtual asset (such as a virtual asset card or a more elaborated digital model) within the VR environment may be mapped to the performance of an actor being captured by the motion capture system in a performance area similar to the area 204. In particular, a set of sensors of the motion capture system may track the actor based on, for example, a motion capture suit worn by the actor. The actor's performance may then be used to move corresponding virtual assets in the 3D virtual environment in real-time or at interactive frame rates. The virtual assets may move while the first user is viewing and/or moving the virtual camera within the VR environment. In one embodiment, the virtual asset card controlled by the second user through the computing device may interact with the virtual asset driven by the actor.

V. Virtual Set Recording and Playback

A. Playback

In some embodiments, as the first user is moving the virtual camera around the VR environment, the system 100 may record or capture the VR environment (including the movement of the virtual asset cards controlled by the second mobile device) shown to the first user as well as the virtual camera's location, orientation, and any associated parameters over time. The recording may be saved and later played back for review and aid in the rapid development of an item of content.

In implementations, the first user may be enabled to record the movements of VR asset cards as they are being controlled by the second user. For instance, as shown in FIG. 6, a menu 606 of items may be provided in the display of HMD 104 and the first user 206 may select a menu item 606 (e.g., via an input device such as a data glove worn by the first user or a moble device of the first user) to generate an instruction to record the movement of the virtual asset card(s) as they are being moved around by the second user 606 through the computing device 102 associated with the second user 606. The recorded movements of virtual asset cards can then be recorded and stored in the storage 312.

The recordings of the virtual asset cards can be retrieved and played back on a display device. The display device may be associated with the first user, the second user, the third user and/or any other user. For example, display device may be a desktop computer associated with the first user, e.g., the director. Through the desktop computer, the first user may be enabled to generate a replay request to replay a particular recording of the VR environment—e.g., when the virtual asset cards 304n and 304a were moved by the second and third user. The recording may include frames that were rendered by the server 108. These frames may be presented to the first user to show the movements of the virtual asset cards in the VR environment. In some implementations, every a few frames in the recording may be presented on the display place much like a storyboard. For example, every 4th or 8th frame in the recording may be presented on the display device.

Figure 7:
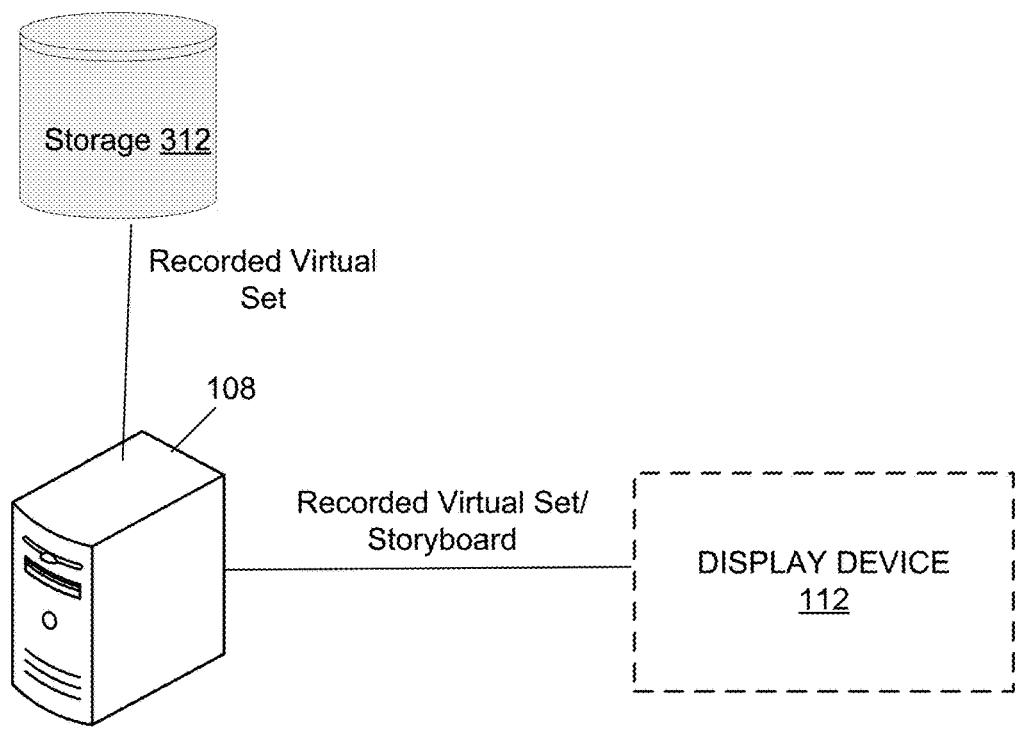
FIG. 7 illustrates one example of retrieving a recording of the VR environment for playback on a display device.

FIG. 7 illustrates one example of retrieving a recording of the VR environment for playback on a display device. As shown in this example, the recorded virtual set in the previous pass can be retrieved from storage 312 and provided to a display device 112 for presentation. In some implementations, the server 108 may be configured to create a storyboard using the recorded virtual set. As described above, in one example, the server 108 is configured to use every $4^{th}$ or $8^{th}$ of the frames in the recorded virtual set to create the storyboard.

B. Recording of Audio

In some embodiments, a user may be enabled to provide voice inputs when controlling the virtual asset cards through a computing device 102 associated with the user.

Figure 8:
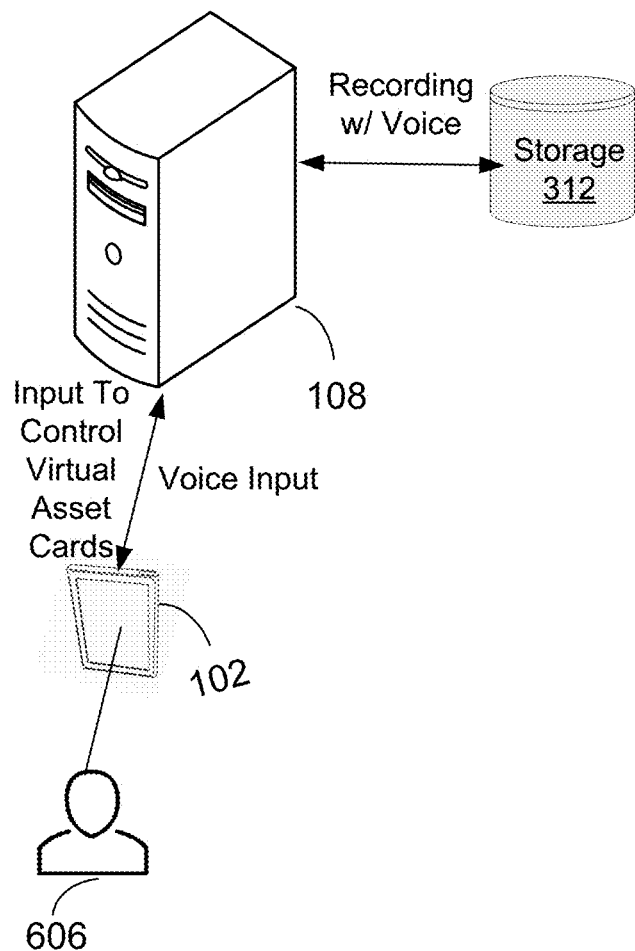
FIG. 8 illustrates one example of enabling a user to provide voice inputs while controlling the virtual asset cards through a computing device.

FIG. 8 illustrates one example of enabling a user to provide voice inputs while controlling the virtual asset cards through a computing device 102. In this example, the second user 606 is enabled to provide voice inputs and as well as inputs to control the virtual asset card(s). For instance, when the second user is moving the virtual asset card 304n, the first user—e.g., director may instruct the second user to read a narrative explaining the scene. The narrative read by the second user may then be captured a recording device on the computing device 102. The captured voice inputs may be transmitted to server 108 along with the inputs to control the virtual asset card (e.g., moving the virtual asset card to its left) to server 108. In some implementations, the voice inputs may be stored in a separate file from the recorded virtual set and synchronized frame to frame with the recorded virtual set.

After receiving these inputs, the server 108 may re-render the virtual set with the voice inputs and present the re-rendered the virtual set on the HMD 104 such that the narrative provided by the second user can be heard in the VR environment. For example, the re-rendering may involve incorporating the voice file containing the narrative provided by the second user into the frames of the VR environment. In those embodiments, the first user can then indicate whether to record the movements of the virtual asset cards with the voice inputs provided by the second user. When the director indicates to record the movement with voice, the voice file can be imported into the video file of the recording.

C. Mapping of Cards to More Complex (Geometric) Assets

In some embodiments, each virtual asset card may be mapped to a relatively more complex geometric asset and/or different positions or deformations of the relatively more complex geometric asset by server 108. For example, a three dimensional geometric asset of a fish may be generated by an animator and stored in storage 312. The three dimensional geometric asset may include and/or be associated with a plurality of animation controls and variables, textures, and rig data describing how the geometric asset can move/be animated. The geometric asset may additionally be greater than a threshold depth such that it does not appear flat or substantially flat.

In one embodiment, one or more virtual asset cards representing a dog may be mapped to or otherwise associated with the three dimensional geometric asset. In some embodiments, each virtual asset card may be associated with a different deformation, position, orientation, or configuration of the geometric asset. For example, a first card may include an image of the dog's mouth open. The first card may be mapped to a positioning of the geometric asset where the mouth of the geometric asset is open. Likewise, a second card may include an image of the dog's mouth closed. The second card may be mapped to a positioning of the geometric asset where the mouth of the geometric asset is closed.

In some embodiments, during playback of a recording of the VR environment, a user may indicate to the rendering system to use the geometric asset rather than the virtual cards. As a result, the geometric asset may automatically replace the virtual cards in images of the saved recording. Specifically, movement, positioning, and orientation information for the virtual cards saved in the recording may be used to also move, position, and/or orient the geometric asset. Additionally, the geometric asset may be moved, changed, and/or animated according to the displayed virtual card specified at each point in time of the recording. For example, at time t1, a virtual card showing a dog with a closed mouth may be displayed. The virtual card may be mapped to a closed mouth position of the geometric asset. Thus, the rendering system may automatically put the geometric asset in a closed mouth position when playing back the recording at t1. At time t2, a virtual card showing the dog with an open mouth may be displayed. The virtual card may be mapped to an open mouth position of the geometric asset. Thus, the rendering system may automatically put the geometric asset in an open mouth position when playing back the recording at t2.

VI. A Method for Controlling a Virtual Asset in a Virtual Set

Figure 9:
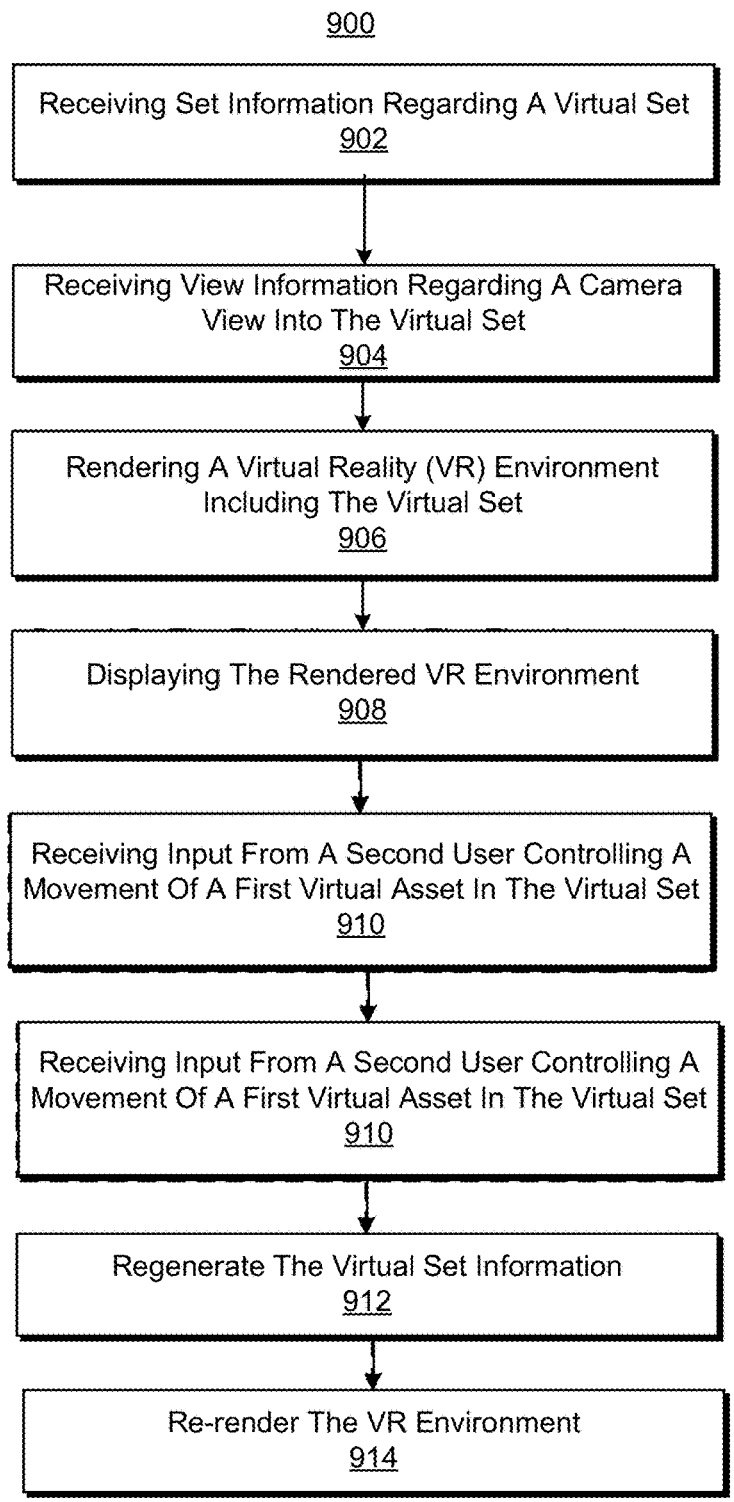
FIG. 9 illustrates one exemplary method of controlling a virtual asset in a virtual set in accordance with the disclosure.

FIG. 9 illustrates one exemplary method of controlling a virtual asset in a virtual set in accordance with the disclosure. The method presented in FIG. 9 and described below is intended to be illustrative and non-limiting. The particular series of processing steps depicted in FIG. 9 is not intended to be limiting. It is appreciated that the processing steps may be performed in an order different from that depicted in FIG. 9 and that not all the steps depicted in FIG. 9 need be performed. In certain implementations, the method 900 may be generated by a computer system, such as the system 1000 shown in FIG. 10.

In some embodiments, the method depicted in method 900 may be generated in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

At 902, virtual set information regarding a virtual set of a 3D animated scene can be received. The virtual asset information received at 902 can include information representing a first virtual asset placed in the virtual set. The first virtual asset can include any object that may be placed in the virtual set by an artist when creating the virtual set. In some implementations, the information representing the first virtual set can indicate a virtual asset card as described and illustrated herein. An example of a virtual set that includes virtual asset cards is illustrated in FIG. 4.

At 904, view information regarding a camera views into the virtual set may be received. The view information may represent a first user's vantage point at which the first user is looking at the virtual set. For example, the first user may be looking up with an HMD into the VR environment or may walk around in a performance area (e.g., the area 204 shown in FIG. 2) monitored by multiple sensors. The orientation of the HMD and/or the position of the first user in the performance area can be used as user input indicating a view perspective of the VR environment the first user is looking into. An example, a view of the first user is illustrated in FIG. 5.

At 906, a VR environment including the virtual set may be rendered based on the virtual set information received at 902 and the view information received at 904. Rendering the VR environment at 906 may involve taking a camera view such that the virtual set is rendered in the VR environment from that camera view. The specific locations of the different objects can be determined relative to a position of the user, and the viewpoint can be determined to identify the locations and perspective of the objects for displaying to the user. The rendering can be performed using techniques known to one skilled in the art.

At 908, the VR environment is sent to a first user on a HMD and a second user on computing device associated with the second user. As described herein, the first user may be a director engaging in various activities such as set dressing and storyboard creation through the VR environment. The second user may be an assistant of the first user, for example a technical enabler that can control virtual assets in the virtual asset from the computing device associated with the second user (e.g., a tablet of the second user).

At 910, an input may be received from the second user. The input received at 910 may be for controlling a movement of a virtual asset in the virtual set. For example, while the first user is experiencing in the VR environment, the first user may give an instruction to the second user to move a particular first virtual asset in the VR environment for a distance. The second user may then manipulate (e.g., dragging by holding and swiping) the virtual asset accordingly on the computing device associated with the second user. An input indicating the movement of the virtual asset may then be generated for the second user based on the manipulation of the virtual asset provided by the second through the computing device associated with second user. For example, the input may indicate moving the virtual asset from position (x, y, z) to position (x', y', z') in the virtual set. An example of controlling a virtual asset in the virtual set is illustrated in FIG. 6. In some embodiments, the input received at 910 may include a voice input from the second user. For example, the first user may instruct the second user read a narrative when moving the virtual asset. Such an voice input can be captured along with the input for moving the virtual asset.

At 912, the virtual set may be re-generated base on the inputs received at 910. The regeneration of the virtual set at 912 can involve simulating the movement of the virtual asset(s) in accordance with the input received at 910. In some embodiments, the regeneration of the virtual set at 912 can include implementing a voice over the controlled movement of the virtual asset(s) in the VR environment.

At 914, the VR environment may be re-rendered based on the virtual set information regenerated at 912. After the re-rendering of the VR environment, the re-rendered VR environment can be presented to the first user through the HMD worn by the first user, the second user through the computing device associated with the second user, and/or any other user.

VII. Example Computer System

Figure 10:
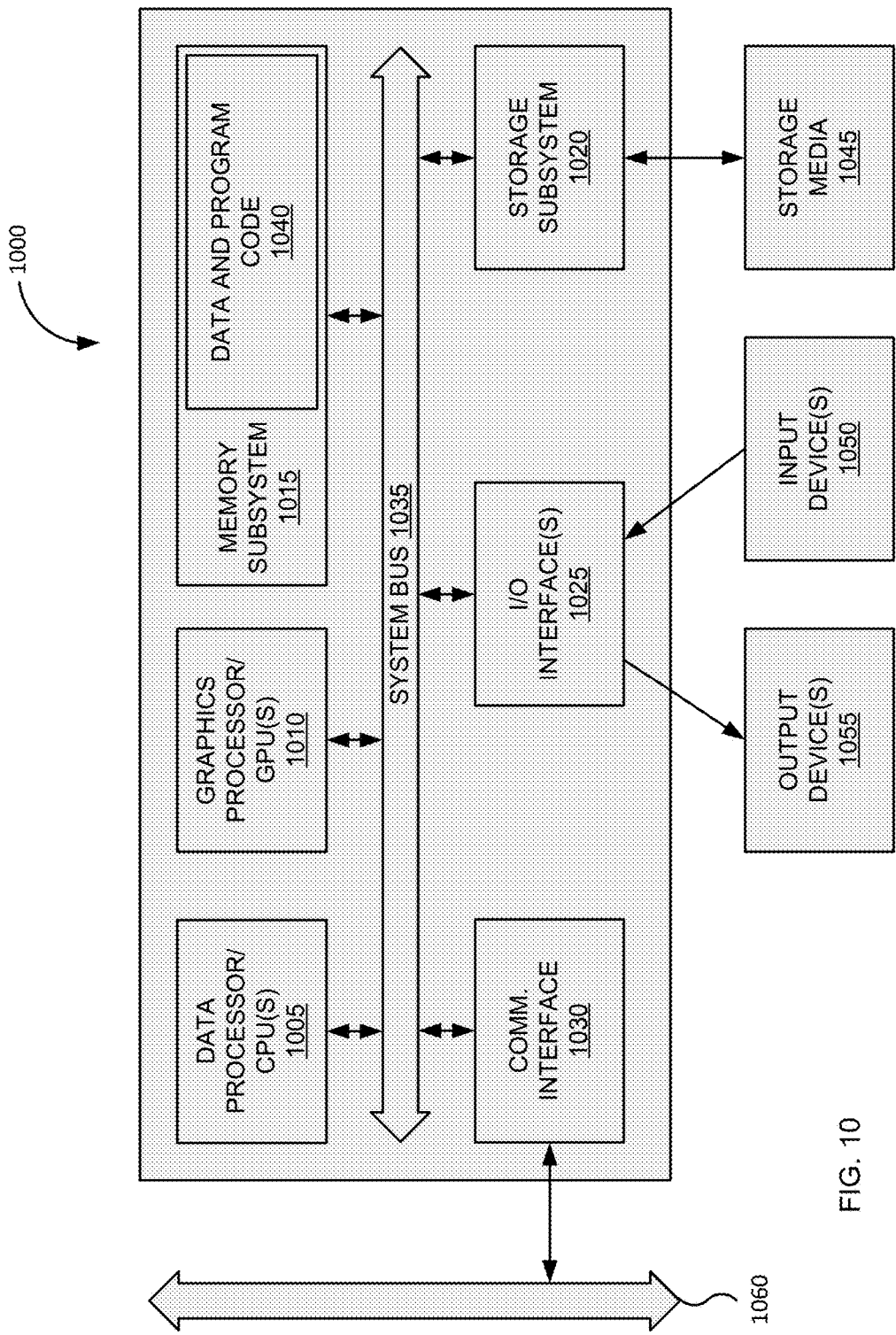
FIG. 10 is a block diagram of computer system 1000 that may incorporate an embodiment, be incorporated into an embodiment, or be used to practice any of the innovations, embodiments, and/or examples found within this disclosure.

FIG. 10 is a simplified block diagram of system 1000 for creating computer graphics imagery (CGI) and computer-aided animation that may implement or incorporate various embodiments. In this example, system 1000 can include one or more design computers 1010, object library 1020, one or more object modeler systems 1030, one or more object articulation systems 1040, one or more object animation systems 1050, one or more object simulation systems 1060, and one or more object rendering systems 1080. Any of the systems 1030-1080 may be invoked by or used directly by a user of the one or more design computers 1010 and/or automatically invoked by or used by one or more processes associated with the one or more design computers 1010. Any of the elements of system 1000 can include hardware and/or software elements configured for specific functions.

The one or more design computers 1010 can include hardware and software elements configured for designing CGI and assisting with computer-aided animation. Each of the one or more design computers 1010 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 1010 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 1010 acting as a modeler may employ one or more systems or tools to design, create, or modify objects within a computer-generated scene. The modeler may use modeling software to sculpt and refine a 3D model to fit predefined aesthetic needs of one or more character designers. The modeler may design and maintain a modeling topology conducive to a storyboarded range of deformations. In another example, a user of the one or more design computers 1010 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 1010 acting as an animator may employ one or more systems or tools to specify motion and position of one or more objects over time to produce an animation.

Object library 1020 can include elements configured for storing and accessing information related to objects used by the one or more design computers 1010 during the various stages of a production process to produce CGI and animation. Some examples of object library 1020 can include a file, a database, or other storage devices and mechanisms. Object library 1020 may be locally accessible to the one or more design computers 1010 or hosted by one or more external computer systems.

Some examples of information stored in object library 1020 can include an object itself, metadata, object geometry, object topology, rigging, control data, animation data, animation cues, simulation data, texture data, lighting data, shader code, or the like. An object stored in object library 1020 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 1030 can include hardware and/or software elements configured for modeling one or more objects. Modeling can include the creating, sculpting, and editing of an object. In various embodiments, the one or more object modeling systems 1030 may be configured to generated a model to include a description of the shape of an object. The one or more object modeling systems 1030 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 1030 may further generate model data (e.g., 2D and 3D model data) for use by other elements of system 1000 or that can be stored in object library 1020. The one or more object modeling systems 1030 may be configured to allow a user to associate additional information, metadata, color, lighting, rigging, controls, or the like, with all or a portion of the generated model data.

The one or more object articulation systems 1040 can include hardware and/or software elements configured to articulating one or more computer-generated objects. Articulation can include the building or creation of rigs, the rigging of an object, and the editing of rigging. In various embodiments, the one or more articulation systems 1040 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 1040 may further generate articulation data (e.g., data associated with controls or animations variables) for use by other elements of system 1000 or that can be stored in object library 1020. The one or more object articulation systems 1040 may be configured to allow a user to associate additional information, metadata, color, lighting, rigging, controls, or the like, with all or a portion of the generated articulation data.

The one or more object animation systems 1050 can include hardware and/or software elements configured for animating one or more computer-generated objects. Animation can include the specification of motion and position of an object over time. The one or more object animation systems 1050 may be invoked by or used directly by a user of the one or more design computers 1010 and/or automatically invoked by or used by one or more processes associated with the one or more design computers 1010.

In various embodiments, the one or more animation systems 1050 may be configured to enable users to manipulate controls or animation variables or utilized character rigging to specify one or more key frames of animation sequence. The one or more animation systems 1050 generate intermediary frames based on the one or more key frames. In some embodiments, the one or more animation systems 1050 may be configured to enable users to specify animation cues, paths, or the like according to one or more predefined sequences. The one or more animation systems 1050 generate frames of the animation based on the animation cues or paths. In further embodiments, the one or more animation systems 1050 may be configured to enable users to define animations using one or more animation languages, morphs, deformations, or the like.

The one or more object animations systems 1050 may further generate animation data (e.g., inputs associated with controls or animations variables) for use by other elements of system 1000 or that can be stored in object library 1020. The one or more object animations systems 1050 may be configured to allow a user to associate additional information, metadata, color, lighting, rigging, controls, or the like, with all or a portion of the generated animation data.

The one or more object simulation systems 1060 can include hardware and/or software elements configured for simulating one or more computer-generated objects. Simulation can include determining motion and position of an object over time in response to one or more simulated forces or conditions. The one or more object simulation systems 1060 may be invoked by or used directly by a user of the one or more design computers 1010 and/or automatically invoked by or used by one or more processes associated with the one or more design computers 1010.

In various embodiments, the one or more object simulation systems 1060 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 1060 may be used to simulate the behavior of objects, such as hair, fur, and cloth, in response to a physics model and/or animation of one or more characters and objects within a computer-generated scene.

The one or more object simulation systems 1060 may further generate simulation data (e.g., motion and position of an object over time) for use by other elements of system 100 or that can be stored in object library 1020. The generated simulation data may be combined with or used in addition to animation data generated by the one or more object animation systems 1050. The one or more object simulation systems 1060 may be configured to allow a user to associate additional information, metadata, color, lighting, rigging, controls, or the like, with all or a portion of the generated simulation data.

The one or more object rendering systems 1080 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 1080 may be invoked by or used directly by a user of the one or more design computers 1010 and/or automatically invoked by or used by one or more processes associated with the one or more design computers 1010. One example of a software program embodied as the one or more object rendering systems 1080 can include PhotoRealistic RenderMan, or PRMan, produced by Pixar Animations Studios of Emeryville, Calif.

In various embodiments, the one or more object rendering systems 1080 can be configured to render one or more objects to produce one or more computer-generated images or a set of images over time that provide an animation. The one or more object rendering systems 1080 may generate digital images or raster graphics images.

In various embodiments, a rendered image can be understood in terms of a number of visible features. Some examples of visible features that may be considered by the one or more object rendering systems 1080 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlight rays on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 1080 may further render images (e.g., motion and position of an object over time) for use by other elements of system 1000 or that can be stored in object library 1020. The one or more object rendering systems 1080 may be configured to allow a user to associate additional information or metadata with all or a portion of the rendered image.

FIG. 10 is a block diagram of computer system 1000. FIG. 10 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 1000 and any of its components or subsystems can include hardware and/or software elements configured for performing methods described herein.

Computer system 1000 may include familiar computer components, such as one or more one or more data processors or central processing units (CPUs) 1005, one or more graphics processors or graphical processing units (GPUs) 1010, memory subsystem 1015, storage subsystem 1020, one or more input/output (I/O) interfaces 1025, communications interface 1030, or the like. Computer system 1000 can include system bus 1035 interconnecting the above components and providing functionality, such connectivity and inter-device communication.

The one or more data processors or central processing units (CPUs) 1005 can execute logic or program code or for providing application-specific functionality. Some examples of CPU(s) 1005 can include one or more microprocessors (e.g., single core and multi-core) or micro-controllers, one or more field-gate programmable arrays (FPGAs), and application-specific integrated circuits (ASICs). As used herein, a processor includes a multi-core processor on a same integrated chip, or multiple processing units on a single circuit board or networked.

The one or more graphics processor or graphical processing units (GPUs) 1010 can execute logic or program code associated with graphics or for providing graphics-specific functionality. GPUs 1010 may include any conventional graphics processing unit, such as those provided by conventional video cards. In various embodiments, GPUs 1010 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1010 may include any number of registers, logic units, arithmetic units, caches, memory interfaces, or the like.

Memory subsystem 1015 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 1015 can include data and program code 1040.

Storage subsystem 1020 can also store information using machine-readable articles, information storage devices, or computer-readable storage media. Storage subsystem 1020 may store information using storage media 1045. Some examples of storage media 1045 used by storage subsystem 1020 can include floppy disks, hard disks, optical storage media such as CD-ROMS, DVDs and bar codes, removable storage devices, networked storage devices, or the like. In some embodiments, all or part of data and program code 1040 may be stored using storage subsystem 1020.

The one or more input/output (I/O) interfaces 1025 can perform I/O operations. One or more input devices 1050 and/or one or more output devices 1055 may be communicatively coupled to the one or more I/O interfaces 1025. The one or more input devices 1050 can receive information from one or more sources for computer system 1000. Some examples of the one or more input devices 1050 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1050 may allow a user of computer system 1000 to interact with one or more non-graphical or graphical user interfaces to enter a comment, select objects, icons, text, user interface widgets, or other user interface elements that appear on a monitor/display device via a command, a click of a button, or the like.

The one or more output devices 1055 can output information to one or more destinations for computer system 1000. Some examples of the one or more output devices 1055 can include a printer, a fax, a feedback device for a mouse or joystick, external storage systems, a monitor or other display device, a communications interface appropriately configured as a transceiver, or the like. The one or more output devices 1055 may allow a user of computer system 1000 to view objects, icons, text, user interface widgets, or other user interface elements. A display device or monitor may be used with computer system 1000 and can include hardware and/or software elements configured for displaying information.

Communications interface 1030 can perform communications operations, including sending and receiving data. Some examples of communications interface 1030 may include a network communications interface (e.g. Ethernet, Wi-Fi, etc.). For example, communications interface 1030 may be coupled to communications network/external bus 1060, such as a computer network, a USB hub, or the like. A computer system can include a plurality of the same components or subsystems, e.g., connected together by communications interface 1030 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 1000 may also include one or more applications (e.g., software components or functions) to be executed by a processor to execute, perform, or otherwise implement techniques disclosed herein. These applications may be embodied as data and program code 1040. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1015 and/or storage subsystem 1020.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

Various embodiments of any of one or more inventions whose teachings may be presented within this disclosure can be generated in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for generating in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for generating content in a virtual reality environment, the method being generated by one or more computer systems including a computer server, the method comprising:
    receiving, at the computer server, set information regarding a virtual set of a three-dimensional animated scene, wherein the set information includes virtual asset information representing a first virtual asset placed in the virtual set;
    receiving, at the computer server from a first user, view information regarding camera views into the virtual set, the view information being generated based on sensors associated with a first display device associated with the first user;
    rendering, at the computer server, a virtual reality environment including the virtual set based on the camera views;
    sending, from the computer server, the rendered virtual reality environment to the first display device associated with the first user for presenting the rendered virtual reality environment on the first display device;
    sending, from the computer server at a same time as the rendered virtual reality environment is sent to the first display device, image data of the rendered virtual reality environment perceived by the first user to a computing device for presenting the rendered virtual reality environment perceived by the first user on the computing device so that the first display device and the computing device are presenting a same virtual reality environment perceived by the first user in real time;
    receiving, at the computer server, input data indicating a first movement of the first virtual asset in the virtual set from the computing device;
    re-rendering, at the computer server, the virtual reality environment based on the input data indicating the first movement of the first virtual asset;
    sending, from the computer server, the re-rendered virtual reality environment to the first display device for presenting the first movement of the first virtual asset in the virtual reality environment to the first user; and
    replaying, from the computer server, the re-rendered virtual reality environment on a second display device by replacing the first virtual asset with a virtual object corresponding to the first virtual asset in the virtual set and simulating the first movement for the virtual object.

2. The method of claim 1, wherein the computing device is a first computing device, and the method further comprises:
    receiving, at the computer server, input data indicating a second movement of a second virtual asset in the virtual set from a second computing device.

3. The method of claim 1, further comprising
    recording, at the computer server, the first movement of the first virtual asset in the virtual set such that the first movement is available for replay;
    receiving, at the computer server, a replay request to replay the first movement of the first virtual asset in the virtual set on a display device; and
    wherein the replaying is in response to the replay request.

4. The method of claim 3, further comprising receiving, at the computer server, a record request from an input device associated with the first user to record the first movement of the first virtual asset, and wherein the first movement of the first virtual asset is recorded after the record request is received.

5. The method of claim 1, wherein the computing device is a first computing device, and the set information includes virtual asset information representing a second virtual asset placed in the virtual set, the method further comprising:
    presenting, from the computer server, the virtual set to a second computing device;
    receiving, at the computer server, a second movement of the second virtual asset in the virtual set from the second computing device, wherein the second movement of the second virtual asset takes place when the first movement of the first virtual asset is taking place;
    simulating, at the computer server, the second movement of the second virtual asset in the virtual set such that the second movement of the second virtual asset is presented in the virtual set to the first user through the first display device when the first movement of the first virtual asset is taking place; and
    recording, at the computer server, the second movement of the second virtual asset in the virtual set for replay.

6. The method of claim 1, further comprising:
    receiving, at the computer server, a voice input through the computing device, the voice input being associated with first movement of the first virtual asset; and
    recording, at the computer server, the voice input with the first movement of the first virtual asset for replay.

7. The method of claim 6, further comprising:
    receiving, at the computer server, changes in camera views as the first user navigates through the virtual set using an input device associated with the first user; and, wherein recording the first movement of the first virtual asset includes recording the first movement of the first virtual asset with a camera view selected by the first user when the first movement of the first virtual asset takes place.

8. The method of claim 1, wherein the set information includes virtual asset information representing a second virtual asset placed in the virtual set, and the method further comprises:
    presenting, from the computer server, the virtual set to the computing device;
    receiving, at the computer server, a second movement of the second virtual asset in the virtual set from the computing device, wherein the second movement of the second virtual asset takes place after the first movement of the first virtual asset;
    simulating, at the computer server, the second movement of the second virtual asset in the virtual set such that the second movement of the second virtual asset is presented in the virtual set to the first user through the first display device after the first movement of the first virtual asset; and recording, at the computer server, the second movement of the second virtual asset in the virtual set for replay.

9. The method of claim 1, wherein the input data indicating the first movement of the first virtual asset in the virtual set received from the computing device includes information indicating an old position and a new position of the first virtual asset in the virtual set.

10. A system for generating content in a virtual reality environment, the system comprising a computer server configured to perform:

receiving set information regarding a virtual set of a three-dimensional animated scene, wherein the set information includes virtual asset information representing a first virtual asset placed in the virtual set;

receiving view information regarding camera views into the virtual set, the view information being generated based on sensors associated with a first display device associated with a first user;

rendering a virtual reality environment including the virtual set based on the camera views;

sending the rendered virtual reality environment to a first display device associated with a first user for presenting the rendered virtual reality environment on the first display device;

sending image data of the rendered virtual reality environment perceived by the first user to a computing device for presenting the rendered virtual reality environment perceived by the first user on the computing device so that the first display device and the computing device are presenting a same virtual reality environment perceived by the first user in real time;

receiving input data indicating a first movement of the first virtual asset in the virtual set from the computing device;

re-rendering the virtual reality environment based on the input data indicating the first movement of the first virtual asset;

sending the re-rendered virtual reality environment the first display device for presenting the first movement of the first virtual asset in the virtual reality environment to the first user; and replaying, from the computer server, the re-rendered virtual reality environment on a second display device by replacing the first virtual asset with a virtual object corresponding to the first virtual asset in the virtual set and simulating the first movement for the virtual object.

11. The system of claim 10, wherein the computing device is a first computing device, and the computer server is further configured to perform:

receiving, at the computer server, input data indicating a second movement of a second virtual asset in the virtual set from a second computing device.

12. The system of claim 10, wherein the computer server is further configured to perform:

recording the first movement of the first virtual asset in the virtual set such that the first movement is available for replay;

receiving a replay request to replay the first movement of the first virtual asset in the virtual set on a display device; and wherein the replaying is in response to the replay request.

13. The system of claim 12, wherein the computer server is further configured to perform: receiving a record request from an input device associated with the first user to record the first movement of the first virtual asset, and wherein the first movement of the first virtual asset is recorded after the record request is received.

14. The system of claim 10, wherein the computing device is a first computing device, and the set information includes virtual asset information representing a second virtual asset placed in the virtual set, the computer server being further configured to perform:

presenting the virtual set to a second computing device;

receiving a second movement of the second virtual asset in the virtual set from the second computing device, wherein the second movement of the second virtual asset takes place when the first movement of the first virtual asset is taking place;

simulating the second movement of the second virtual asset in the virtual set such that the second movement of the second virtual asset is presented in the virtual set to the first user through the display device when the first movement of the first virtual asset is taking place; and recording the second movement of the second virtual asset in the virtual set for replay.

15. The system of claim 10, wherein the computer server is further configured to perform:

receiving a voice input through the computing device, the voice input being associated with first movement of the first virtual asset; and recording the voice input with the first movement of the first virtual asset for replay.

16. The system of claim 15, wherein the computer server is further configured to perform:

receiving changes in camera views as the first user navigates through the virtual set using an input device associated with the first user; and, wherein recording the first movement of the virtual asset includes recording the first movement of the first virtual asset with a camera view selected by the first user when the first movement of the first virtual asset takes place.

17. The system of claim 10, wherein the set information includes virtual asset information representing a second virtual asset placed in the virtual set, and the system being further configured to perform:

presenting the virtual set to the computing device;

receiving a second movement of the second virtual asset in the virtual set from the computing device, wherein the second movement of the second virtual asset takes place after the first movement of the first virtual asset;

simulating the second movement of the second virtual asset in the virtual set such that the second movement of the second virtual asset is presented in the virtual set to the first user through the first display device after the first movement of the first virtual asset; and recording the second movement of the second virtual asset in the virtual set for replay.

18. The system of claim 10, wherein the input data indicating the first movement of the first virtual asset in the virtual set received from the computing device includes information indicating an old position and a new position of the first virtual asset in the virtual set.

* * * * *